United States Patent [19]

Myers

[11] 4,043,786
[45] Aug. 23, 1977

[54] GLASS SHEET CONVEYOR ROLLS AND PROCESS FOR CONVEYING THEREON

[75] Inventor: Dick T. Myers, Willard, Ohio
[73] Assignee: PPG Industries, Inc., Pittsburgh, Pa.
[21] Appl. No.: 674,477
[22] Filed: Apr. 7, 1976
[51] Int. Cl.$^2$ .................. C03B 27/00; C03B 25/04
[52] U.S. Cl. ........................ 65/114; 65/118; 65/349; 65/351
[58] Field of Search ............ 65/107, 114, 118, 119, 65/348, 349, 350, 351

[56] References Cited

U.S. PATENT DOCUMENTS 3,881,906  5/1975  Ritter, Jr. et al. .............. 65/349 X Primary Examiner—Arthur D. Kellogg
Attorney, Agent, or Firm—Dennis G. Millman; Edward I. Mates

[57] ABSTRACT

This invention relates to glass sheet conveyor rolls and, particularly, those that are useful in conveying glass sheets through a hot atmosphere. The gist of the invention resides in the manner of supporting rigid, unitary conveyor rolls on three bearing housings, a pair of which is located to one side of the conveyor path provided by a set of conveyor rolls. According to a specific embodiment of this invention, the outer bearing housing of the pair of bearing housings is supported slightly above the one horizontal plane of support for the other bearing housings supporting each conveyor roll so as to impart a stress causing each conveyor roll of cylindrical configuration to develop a slightly concave upper surface during rotation. The stressed rolls engage the bottom surface of conveyed glass sheets along their opposite longitudinal side edges only, thus reducing roll marking, and the stress applied reduces whipping when the rolls are rotated for conveying flat glass sheets through a hot atmosphere such as a glass sheet heating furnace.

6 Claims, 4 Drawing Figures

GLASS SHEET CONVEYOR ROLLS AND PROCESS FOR CONVEYING THEREON

BACKGROUND OF THE INVENTION

1. Field of the Invention

This invention relates to the heat treating of glass sheets, particularly the heat treating of flat glass sheets while the latter are conveyed in a horizontal orientation along a horizontally extending path through a heating furnace, where glass sheets are heated to an elevated temperature sufficient for further fabricating processes, such as tempering, annealing and coating by the application of coating compositions which, on contacting a heated glass surface, form a coating that bonds strongly thereto.

In the heat treating of glass sheets, particularly flat glass sheets, a succession of glass sheets is conveyed through a tunnel-type of furnace comprising a plurality of spaced, horizontally extending rolls, each extending transversely of the furnace to provide a horizontally extending path through the furnace. In the past, glass sheets were likely to become scuffed or provided with a defect known as roll ripple distortion as the glass sheets were engaged completely across their dimensions extending transverse to the direction of movement by rolls extending continuously across the extent of the furnace. Any misaligned rolls at a higher elevation than other rolls tended to mark and distort the glass. Furthermore, since different portions of the heating furnace are at different temperatures, the rolls at different portions of the furnace tended to increase in length to a different degree in different portions of the furnace, thereby developing a different amount of sag. Prior to the present invention, attempts were made to counteract this sag by imparting stress to the rolls that tended to bow them upward in their glass engaging regions. Thus, such glass sheets were engaged in their central portions of the vision area so that any variation from roll to roll would have a harmful effect on the optical properties of glass sheets so treated.

Another effect prominent in glass sheet conveying rolls when rotating at high speed is the tendency of the rolls to whip. This whipping tends to raise and lower different portions of a glass sheet as the latter is conveyed over each different roll. This defects resulting from this whipping of the rolls is further complicated by the fact that different conveyor rolls do not whip in unison with one another so that such non-uniform whipping further complicates the resulting defect pattern.

2. Description of the Prior Art

U.S. Pat. Nos. 1,879,998 and 1,885,306 to Sylvester disclose bearing arrangements for rotatably supporting glass sheet conveyer rolls which may be adjusted vertically to deflect the body portions of the roll to a slight degree to develop a convex shape in elevation or "crown" that counteracts the tendency of the roll to sag under heat and weight.

Other pertinent patents discovered in a novelty search include U.S. Pat. Nos. 886,998 to Love; 1,856,668 to Sylvester; 1,851,609 to Waldron; 1,868,060 and 1,889,082 to Von Reis; 2,135,175 to Fallon; 2,676,387 to McArn; 3,086,279 to Alexeff; 3,424,651 to DeNoyer et al and 3,881,906 to Ritter et al. In addition, British patent specification No. 1,035,527 to Justus was also reported in a novelty search.

The gist of the various patents relates to apparatus for mounting a roll that is subject to a load tending to effect downward deflection or sag in the center portion of the roll axis and means for counterbalancing such sag.

SUMMARY OF THE INVENTION

The present invention relates to a novel arrangement of bearing housings that, in a specific embodiment, support rigid, unitary, metal conveyer rolls of cylindrical configuration in such a manner as to impart a compression stress along the length of the roll in such a manner as to cause each roll to bow slightly to develop a curvature that is concave in elevation. The stressing of the rolls reduces the tendency of the rolls to whip. The bowing of the rolls to form concave shapes in elevation causes the rolls to engage only the opposite longitudinal side edge margins of flat glass sheets that are conveyed through an elongated furnace. Therefore, the conveyor rolls in the furnace do not engage the central portion of the glass sheets where they are likely to induce optical distortion.

Glass sheets supported along their longitudinal portions tend to sag downward. However, the rate of speed of the glass sheets through the furnace can be correlated with the roll to roll spacing and the amount of heat that is imparted along the path taken by the glass sheets through the furnace that the glass sheets do not sag into full contact with the rolls or, if such sagging of glass sheets does occur, it occurs for such a short portion of the furnace length, that is, near the furnace exit only, that the likelihood of misaligned or warped rolls to impart optical deficiencies due to non-uniformity of shape imparted to the glass is relatively small compared to the results obtained from the prior art attempts to solve the problem of conveyor roll sagging where the entire width of glass sheets was engaged by each conveyor roll in succession.

The present invention will be understood much more clearly in the light of a specific illustrative embodiment to be described.

BRIEF DESCRIPTION OF THE DRAWINGS

In the drawings which form part of a description of an illustrative embodiment, and whereas like reference numbers refer to like structural elements.

DESCRIPTION OF THE PREFERRED EMBODIMENT

Figure 1:
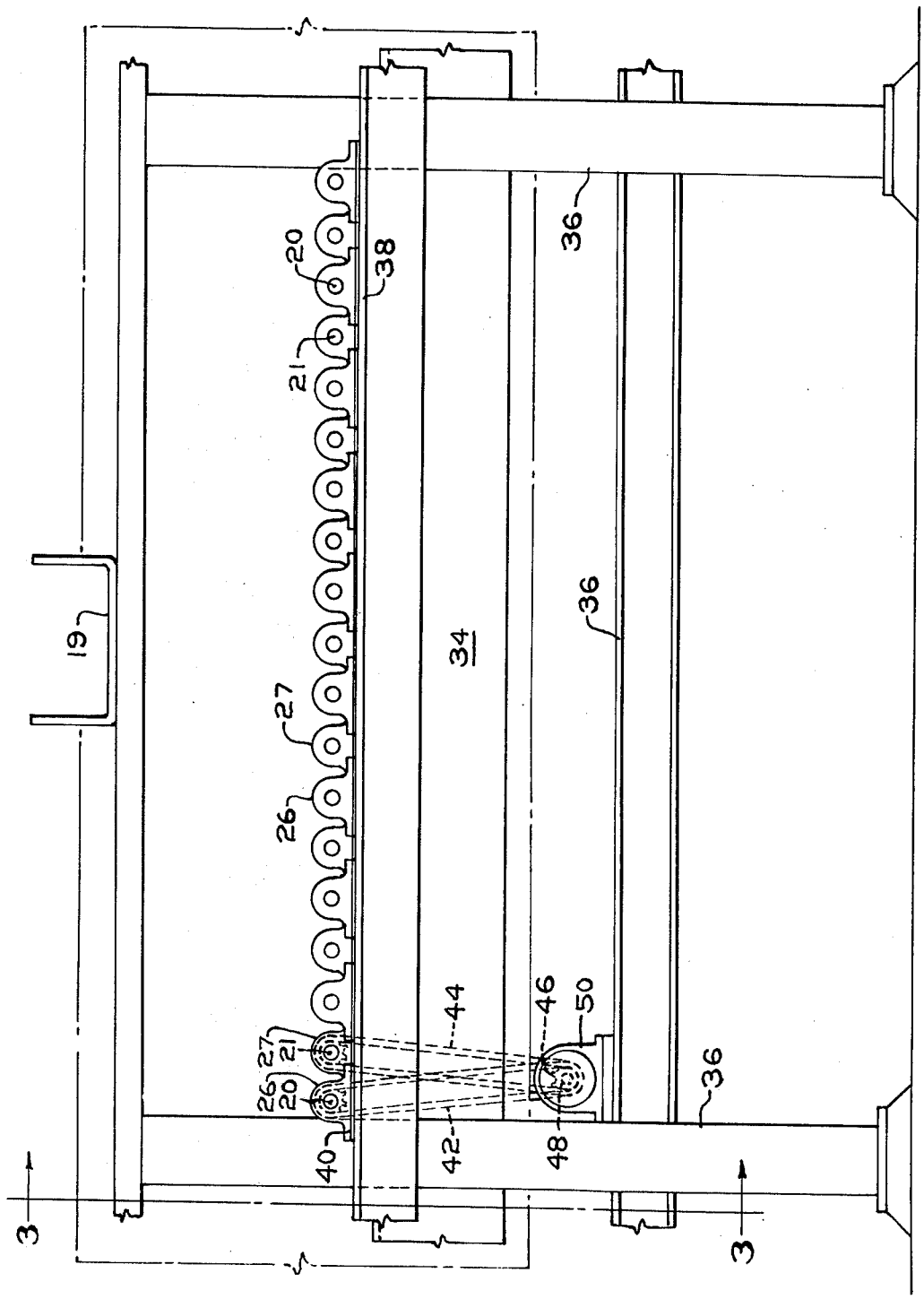
FIG. 1 is a longitudinal sectional view of a fragmentary portion of a conveyor modified according to the present invention.
Figure 2:
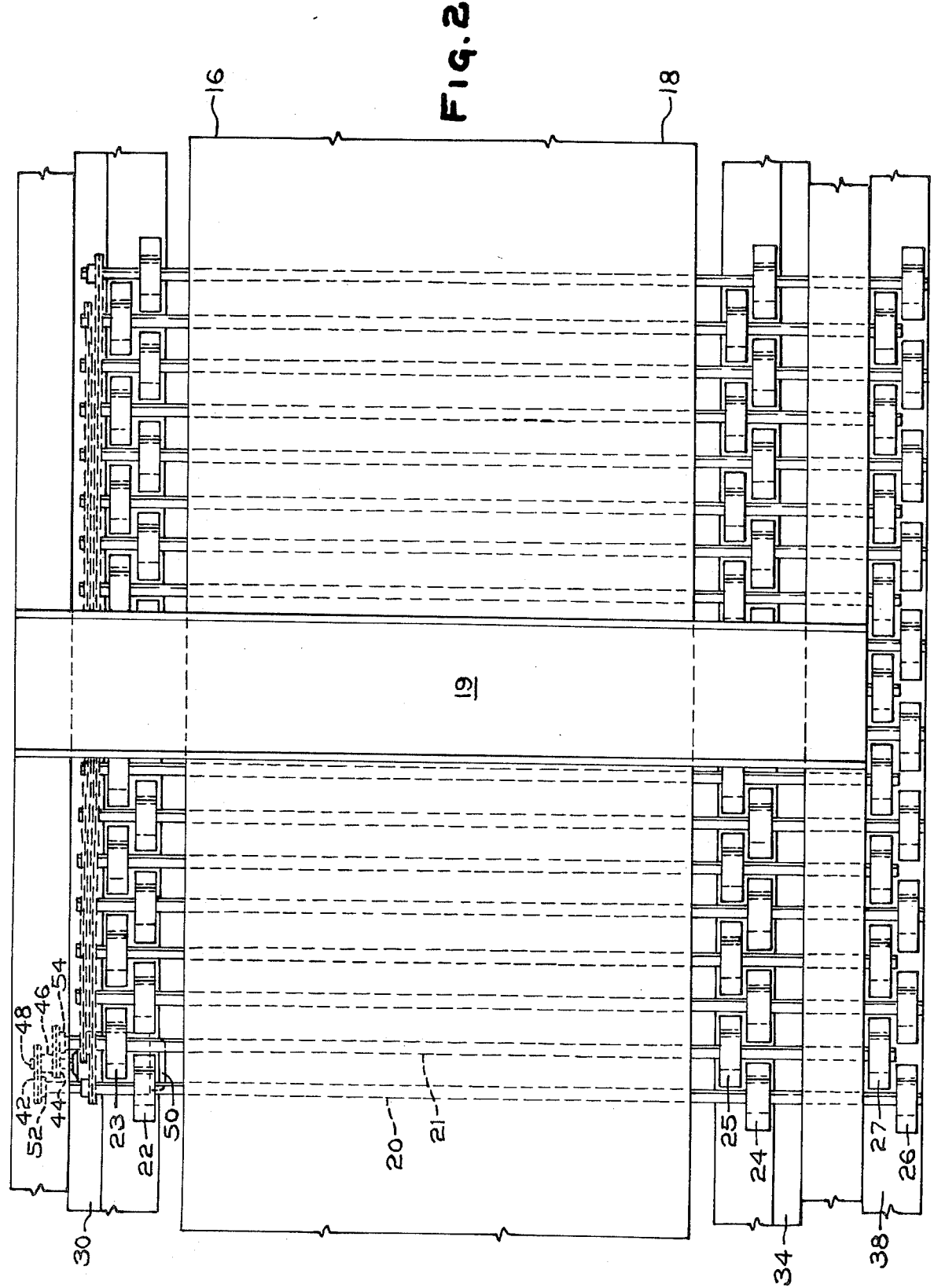
FIG. 2 is a fragmentary plan view of the portion of the conveyor shown in FIG 1.

A typical tunnel-type furnace for heating glass sheets comprises a furnace floor 12, a furnace roof 14, and a pair of furnace sidewalls 16 and 18 defining an elongated hot atmosphere for heating glass sheets. The furnace sidewalls 16 and 18 are apertured at uniformly spaced intervals to receive a series of conveyor rolls 20 and 21. The apertures in the opposing walls are aligned with one another to receive spaced portions of each of the conveyor rolls. The furnace is composed of suitable ceramic material and is supported upon a suitable metal framework including catwalks 19 as well known in the glass sheet furnace art.

Each conveyor roll 20 alternates with an alternate conveyor roll 21. The conveyor rolls 20 are identical to the alternate conveyor rolls 21 except for a slight difference to be explained subsequently.

Each conveyor roll 20 is rotatably supported outside furnace sidewall 16 by a first bearing housing 22 that supports said conveyor roll 20 near one longitudinal end thereof. A second bearing housing 24 and a third bearing housing 26 rotatably support the other longitudinal end portion of conveyor roll 20 outside of furnace sidewall 18. Each alternate conveyor roll 21 is rotatably supported at one edge portion outside of furnace sidewall 16 by a first bearing housing 23 and its other longitudinal end portion is rotatably supported outside of furnace sidewall 18 by a second bearing housing 25 and a third bearing housing 27.

Each of the bearing housings 22 to 27 is identical in structure to each other bearing housing. All of the bearing housings 22 and 23 are supported on longitudinally and horizontally extending angle members 30 secured to spaced vertical supports 32 disposed to one side of furnace sidewall 16. The second bearing housings 24 and 25 are supported in the same horizontal plane as the first bearing housings 22 and 23 on longitudinally and horizontally extending angle members 34 supported on spaced vertical supports 36 located outside apertured furnace sidewalls 18.

The third bearing housings 26 and 27 are supported on laterally outer, longitudinally and horizontally extending angle members 38 that may be mounted in vertically adjustable relation relative to the spaced vertical supports 36. The furnace is divided into sections, each section being provided with members 30, 34 and 38. Each of the latter are secured in end to end relation to a corresponding member 30, 34 or 38.

Figure 3:
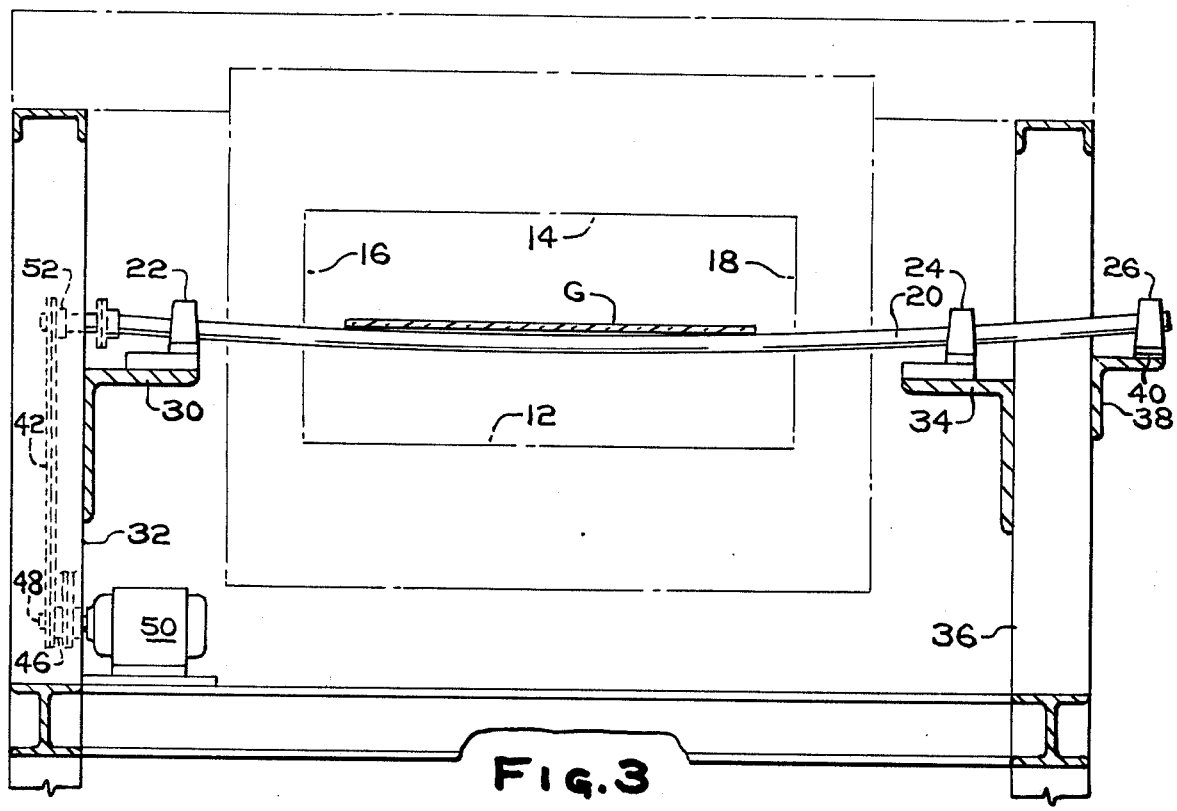
FIG. 3 is a transverse sectional view of a conveyor roll supported in a manner such as to provide a stress that produces downward deflection of its glass sheet supporting portion.

According to one embodiment of the present invention, the vertical position of the longitudinally and horizontally extending angle members 38 (one for each furnace section) is mounted to support the third bearing housings 26 and 27 at a slightly higher elevation than the elevation to which the first bearing housings 22 and 23 and the second bearing housings 24 and 25 are supported. In an alternate embodiment of the invention as depicted in FIG. 3, all the members 30, 34 and 38 are supported at the same elevation and a thin shim 40 is mounted between each of the third bearing housings 26 and 27 and the upper surface of the longitudinally and horizontally extending angle members 38 so as to elevate the third bearing housings 26 and 27 to a slightly higher position than the positions occupied by the first and second bearing housings.

The reason for providing alternate sets of bearing housings (22, 24 and 26 for conveyor rolls 20 and 23, 25 and 27 for alternate conveyor rolls 21) is to provide a roll to roll spacing along the length of the furnace that is as small as possible. The dimensions of the roll bearing housings transverse to the lengths of the conveyor rolls 20 and 21 is such that it is necessary to offset the bearing housing locations somewhat in order to minimize the roll to roll spacing.

A double chain conveyor drive comprising an outer chain 42 and an inner chain 44 driven from a double sprocket 46 on a main drive shaft 48 mounted on a drive motor 50 is used to drive the conveyor rolls 20 and 21 in unison. The outer chain 42 engages sprockets 52, one for each of the conveyor rolls 20, whereas the inner chain 44 engages sprockets 54 mounted on the alternate conveyor rolls 21.

All the conveyor rolls 20 and 21 are driven in unison from the main drive shaft 48. By virtue of having the third bearing housings 26 and 27 disposed at a slightly higher elevation than the elevation to which the first bearing housings 22 and 23 and the second bearing housings 24 and 25 are supported, stresses are imparted to each of the conveyor rolls 20 and 21 so that a bow is imparted to each conveyor roll 20 and 21 so as to provide support for each longitudinal side of a glass sheet G as the latter traverses the furnace. Since each conveyor roll 20 and 21 engages only the longitudinal side edge portions of the glass sheets G that are conveyed through the furnace, they do not mar the major surface supported on the rolls. Even when the glass sheets G sag somewhat, the heating within the furnace by heating elements disposed in the roof 14 and the floor 12 are correlated with the speed of the movement of the glass sheets through the furnace so that the glass sheets do not sag into full contact with the conveyor rolls or only with a small number of conveyor rolls near the furnace exit. In addition, the heat from the heating elements carried by the furnace roof 14 can be supplied at a greater intensity than the heat supplied from the heating elements supported in the furnace floor 12 so that the differentially applied heat tends to bow the glass sheets slightly upward to compensate for the effect of the tendency of the glass sheet sag as the result of its heating. As a result, the tendency of the major surface of the glass sheets to contact the conveyor rolls in their central portion is minimized.

In a typical embodiment of the present invention, a production furnace is provided with a horizontal conveyor comprising spaced, unitary, steel conveyor rolls having a diameter of 1 inch (25.4 millimeters) and a length of 44 inches (1,117.6 millimeters) spaced longitudinally along said conveyor with a center to center spacing between adjacent rolls of 3 inches (76.2 millimeters). Each roll extends approximately 4 inches (101.6 millimeters) beyond the side containing a single bearing housing. The sprocket drivingly connected to the main drive shaft is mounted on this extended portion of each conveyor roll. The other end of each conveyor roll is supported on a pair of bearing housings 8 inches (203.2 millimeters) apart along the length of the supported conveyor roll. The central portion of each conveyor roll extends across a furnace having a furnace cavity 24 inches (609.6 millimeters) wide. The outermost bearing housing of the pair of bearing housings is mounted on a shim 15 mils (approximately 0.38 millimeter) thick. All the bearing housings are mounted on a common horizontal plane except for the outer bearing housings mounted on the shims.

Figure 4:
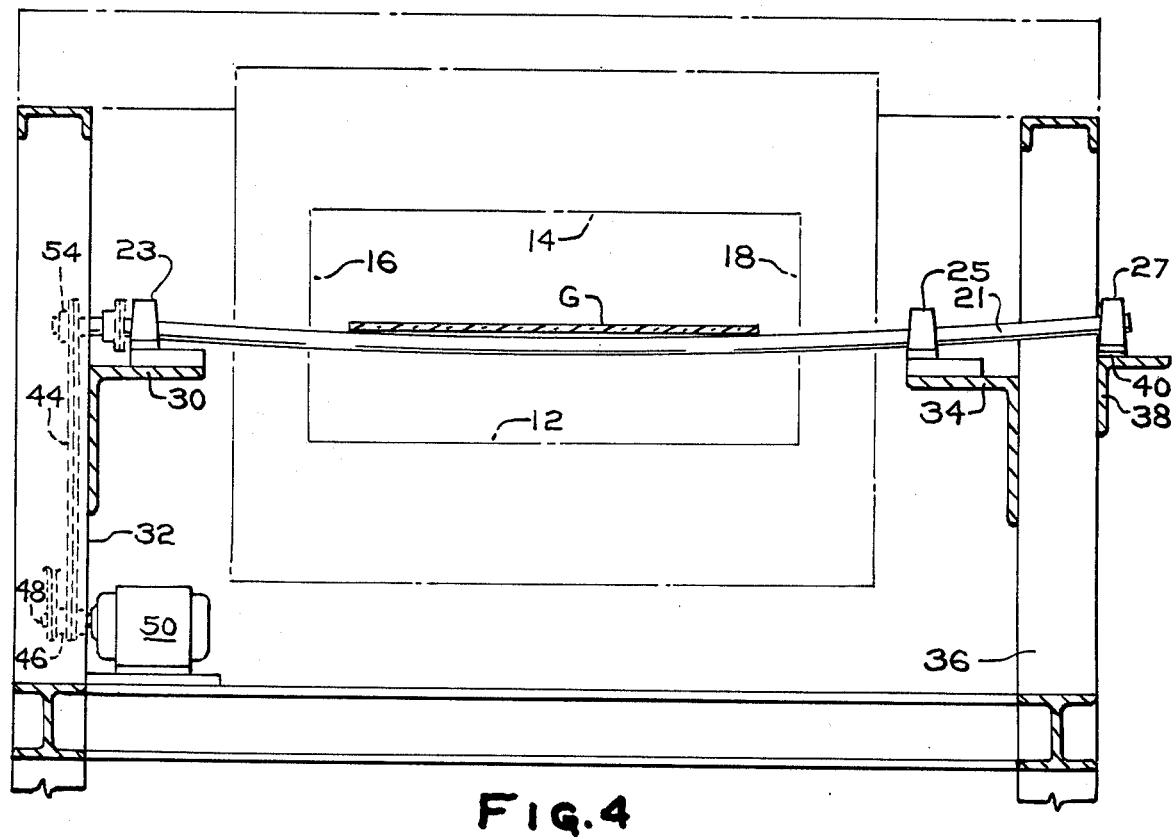
FIG. 4 is a transverse sectional view of a conveyor roll adjacent to the conveyor roll of FIG. 3.

Each conveyor roll 20 and 21 is cylindrical in configuration when unstressed. The difference in elevations of the bearing housings imparts a stress to each unitary metal conveyor roll that develops a longitudinal contour in the roll that is slightly concave in elevation as shown in FIGS. 3 and 4. The concave elevation permits the rolls to make contact along the longitudinal side edges of glass sheets conveyed through the furnace for heat treatment and reduces surface marking and distortion in the vision area of the sheets. This arrangement also imparts sufficient stress to the conveyor rolls to minimize whipping when the conveyor rolls rotate rapidly for conveying flat glass sheets through the furnace in a heating operation.

The form of the invention shown and described previously in this disclosure represents an illustrative preferred embodiment thereof. It is understood that various changes may be made without departing from the gist of the invention as defined in the claimed subject matter that follows.

I claim:

1. Apparatus for conveying glass sheets through a path defined by aligned portions of a series of conveyor rolls spaced from one another along the length of a hot atmosphere comprising a rigid, unitary, metal conveyor roll having an essentially cylindrical configuration when unstressed, a first bearing housing rotatably supporting said conveyor roll in a horizontal plane near one longitudinal end thereof and to one side of said path, a second bearing housing rotatably supporting said conveyor roll in said horizontal plane near the other longitudinal end thereof to the other side of said path, and a third bearing housing rotatably supporting said conveyor roll slightly above said horizontal plane longitudinally outward of one of said other bearing housings, said third bearing housing supporting said conveyor roll at a level sufficiently higher than the first and second bearing housings that the roll is stressed to be bowed slightly downward in the portion thereof aligned with said path whereby said roll has less tendency than an unstressed roll to whip when rotated and said stressed roll supports said conveyed glass sheets substantially entirely along their longitudinal side end portions.

2. Apparatus as in claim 1, wherein a pluality of successive conveyor rolls of said series is supported in a manner similar to said rigid, unitary, metal conveyor roll.

3. Apparatus as in claim 2, wherein said conveyor rolls are drivingly engaged by roll driving means that engages each of said conveyor rolls at an end portion thereof adjacent said end portion to the side of said path that is rotatably supported by one of said bearing housings.

4. A method of conveying a series of flat glass sheets in a longitudinal direction through an elongated heated furnace comprising:

positioning each sheet on a plurality of longitudinally spaced, transversely extending conveyor rolls, maintaining said conveyor rolls stressed so as to bow slightly downward, rotating said conveyor rolls in unison so as to propel each glass sheet in the longitudinal direction while each sheet contacts the rolls along only longitudinal edge portions of each sheet during at least a portion of its passage through the furnace, heating each sheet while supported on said conveyor rolls to a temperature at which each sheet remains substantially flat so that contact between the rolls and center portions of each sheet is minimized, whereby optical distortion in the center portions of the sheets is reduced.

5. A method as in claim 4, wherein said series of glass sheets is conveyed through said furnace at a speed so correlated with the rate that each of said glass sheets is heated as it is conveyed through the furnace that each said glass sheet leaves said furnace before its central portion sags into full contact with any of said conveyor rolls, thereby lessening the likelihood of marring or distorting the central portion of said glass sheets due to their contact with misaligned rolls.

6. A method as in claim 4, wherein said series of glass sheets is conveyed through said furnace at a speed so correlated with the rate that each of said glass sheets is heated as it is conveyed through the furnace that each said glass sheet leaves said furnace after its central portion has sagged into full contact with only a small proportion of said conveyor rolls, thereby lessening the likelihood of marring or distorting the central portions of said glass sheets due to their contact with misaligned rolls because said central portions engage few, if any, conveyor rolls during their passage through said furnace.

* * * * *